6 Sheets—Sheet 1.
T. E. JEFFERSON.
Sulky-Plow.
No. 216,415. Patented June 10, 1879.
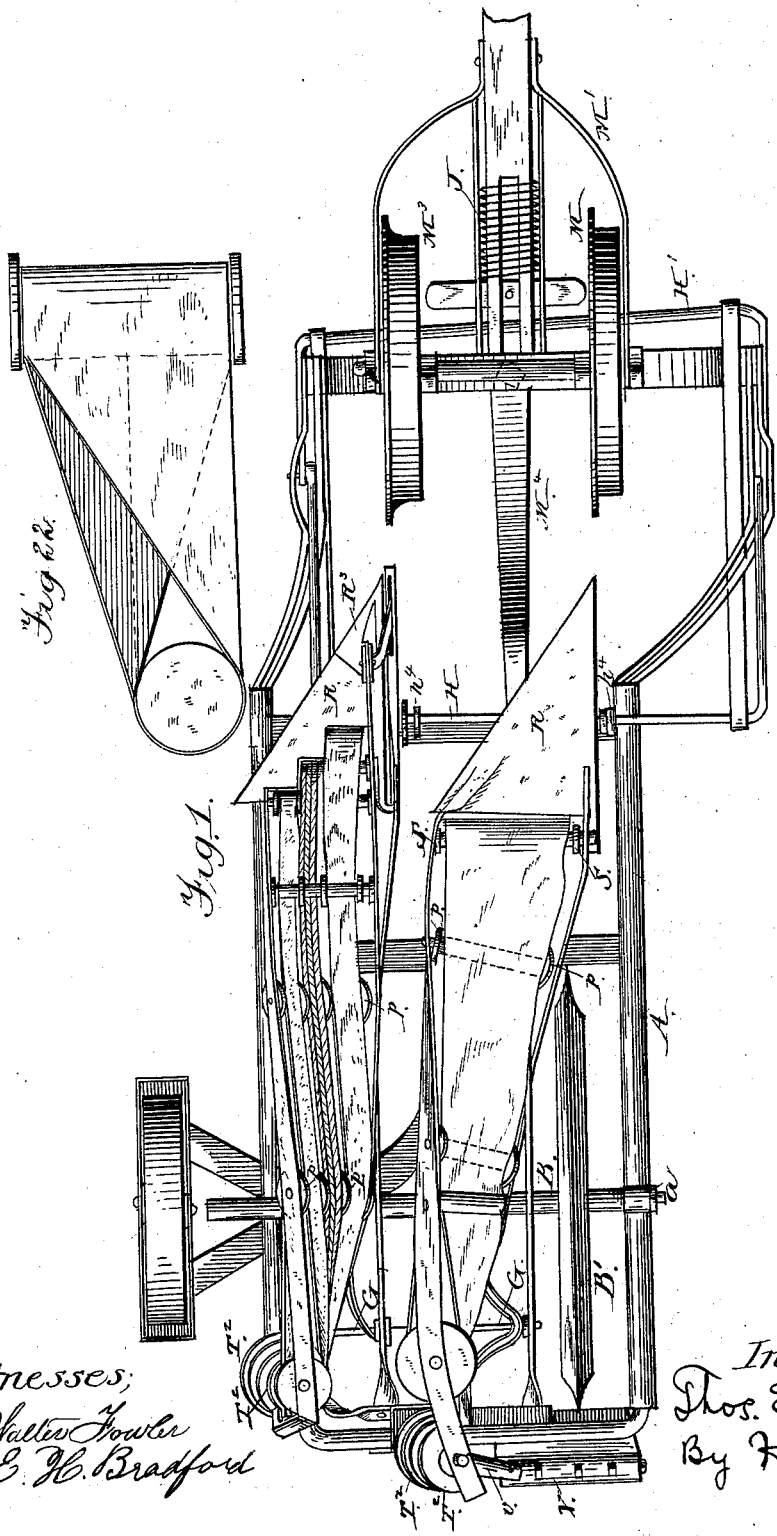

6 Sheets—Sheet 2.
T. E. JEFFERSON.
Sulky-Plow.
No. 216,415. Patented June 10, 1879.
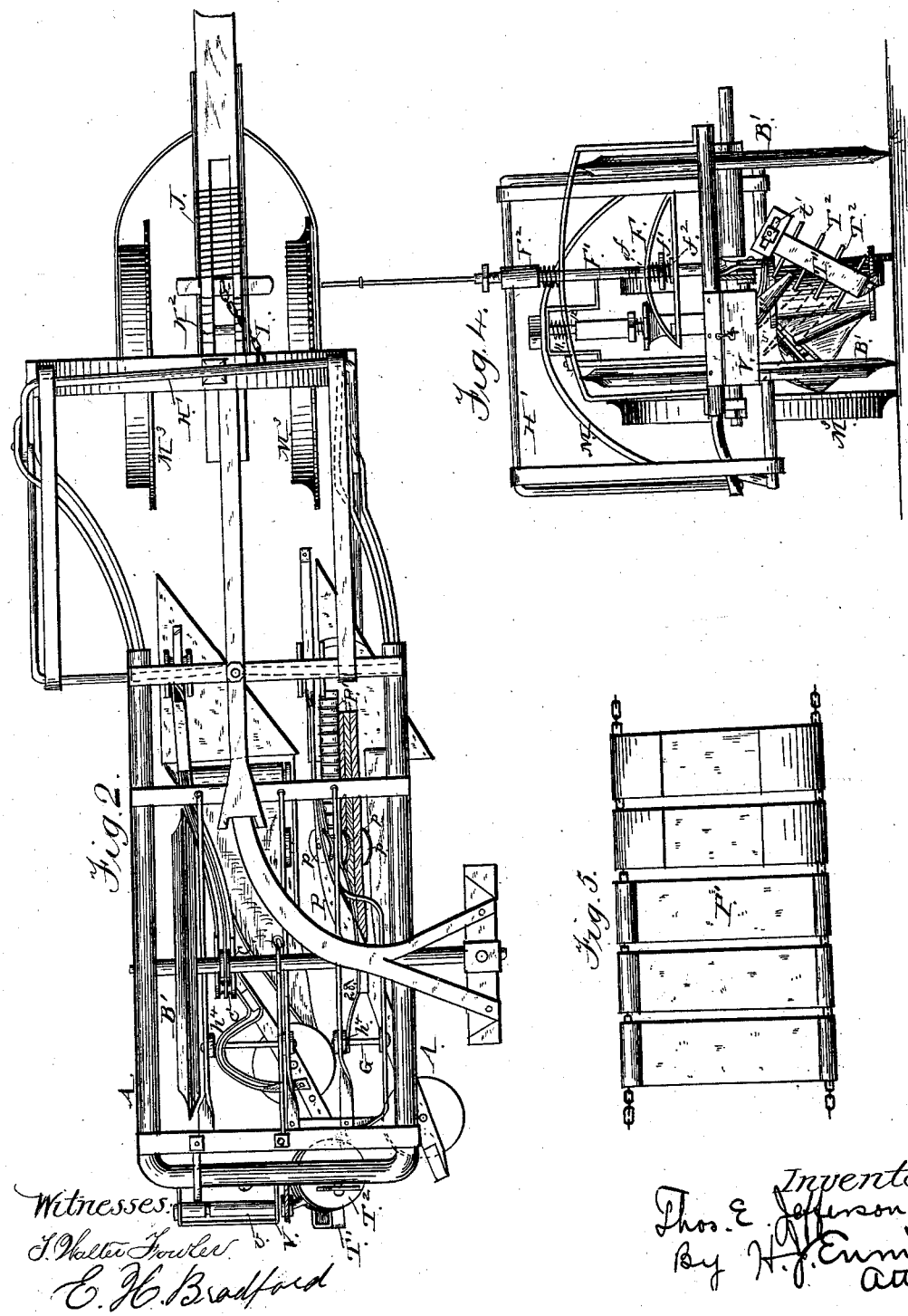

6 Sheets—Sheet 3.
T. E. JEFFERSON.
Sulky-Plow.
No. 216,415. Patented June 10, 1879.
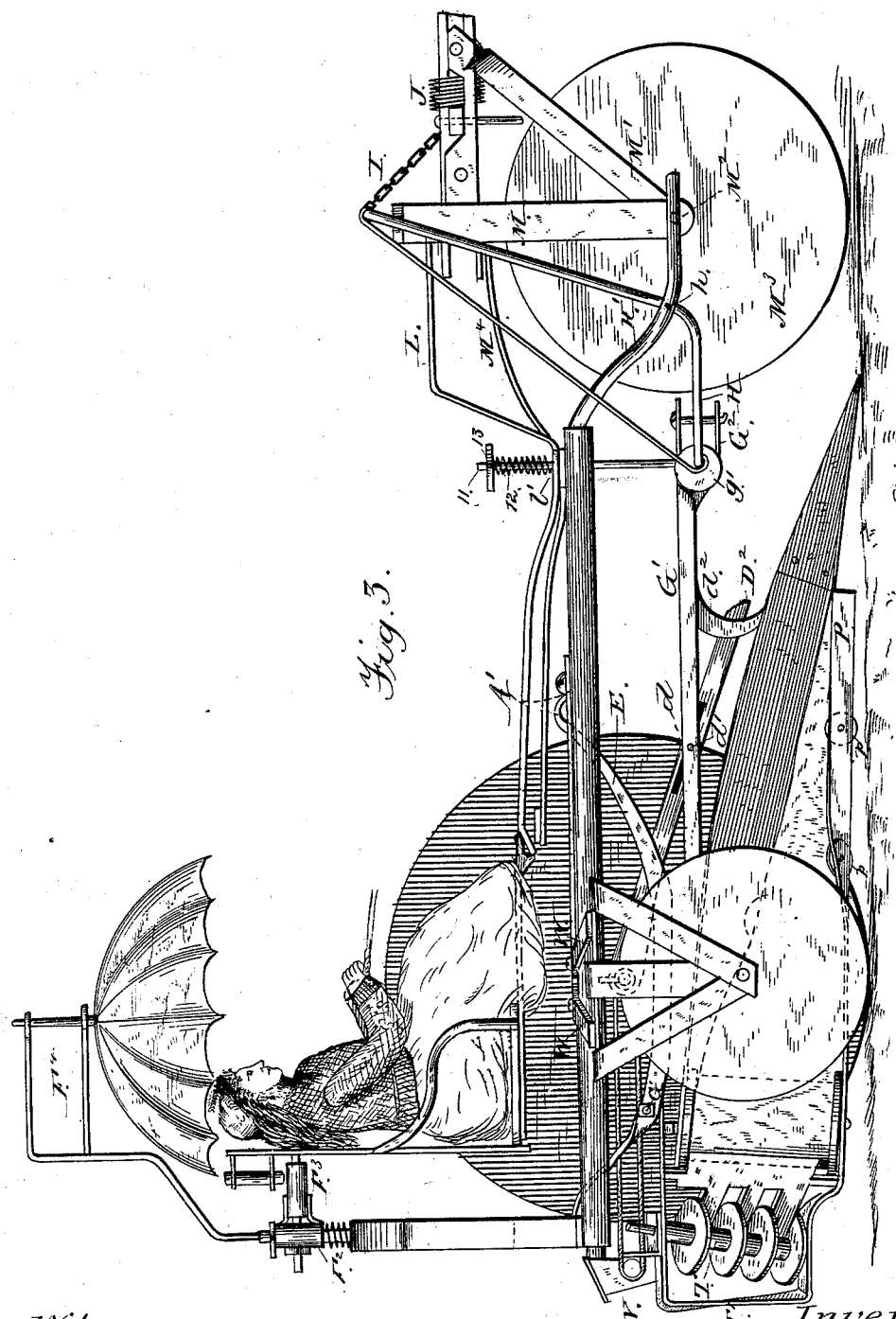
Witnesses:
J. Walter Fowler
E. H. Bradford
Inventor:
Thos. E. Jefferson
By H. P. Ennis
Atty.

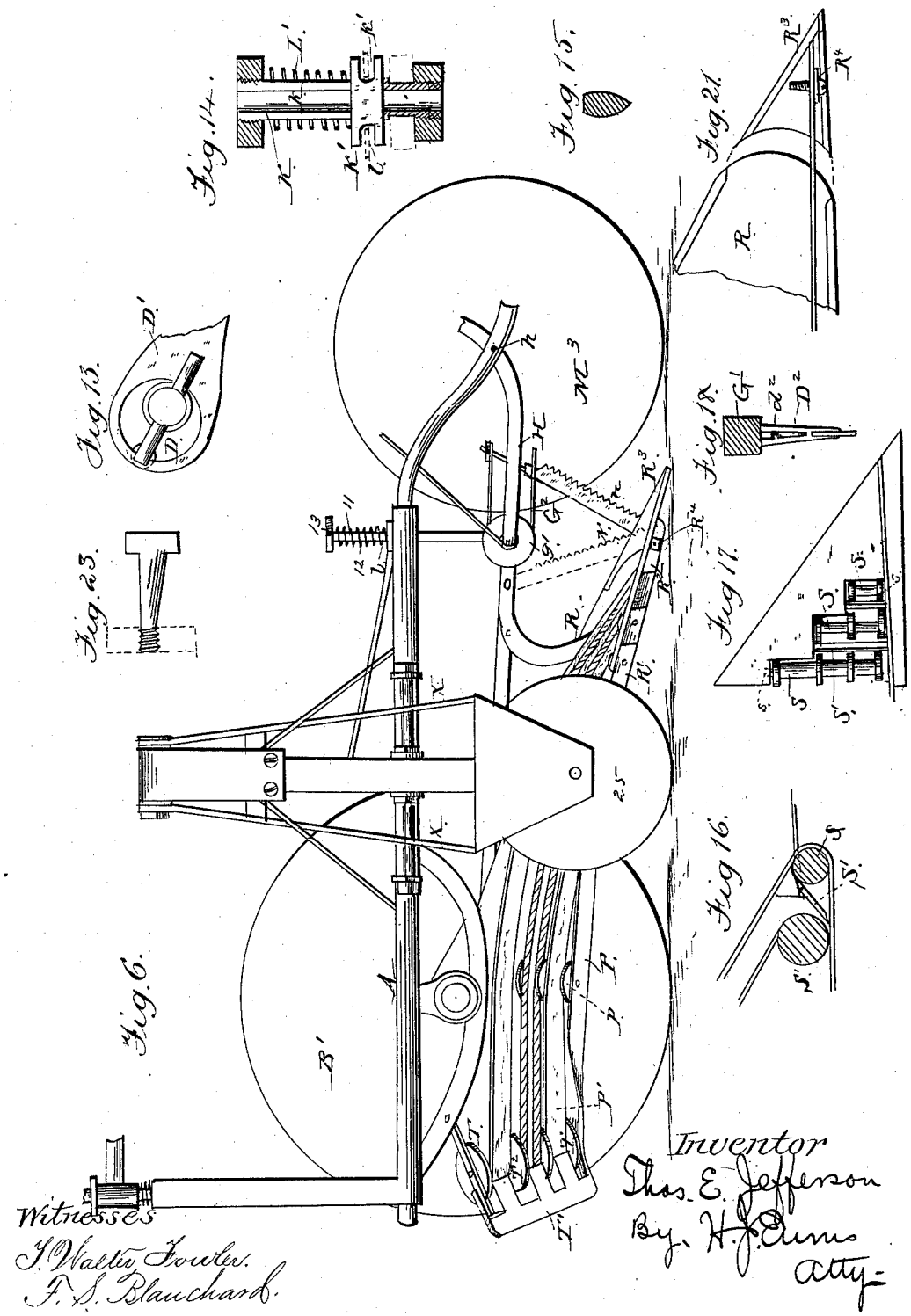

6 Sheets—Sheet 5.
T. E. JEFFERSON.
Sulky-Plow.
No. 216,415. Patented June 10, 1879.
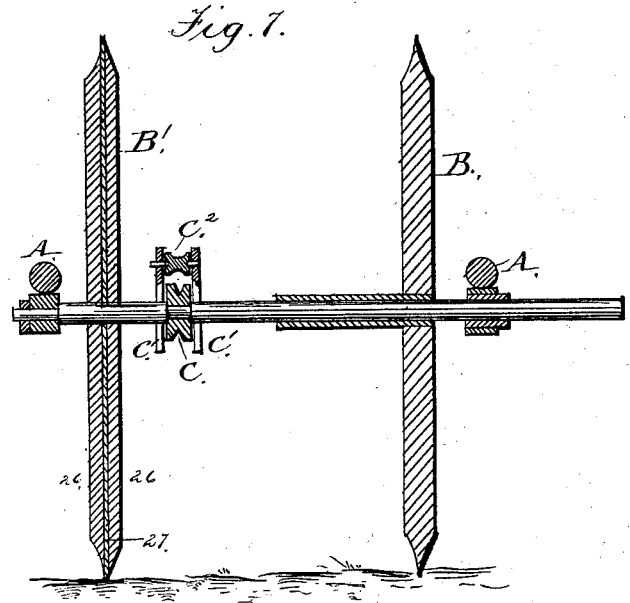
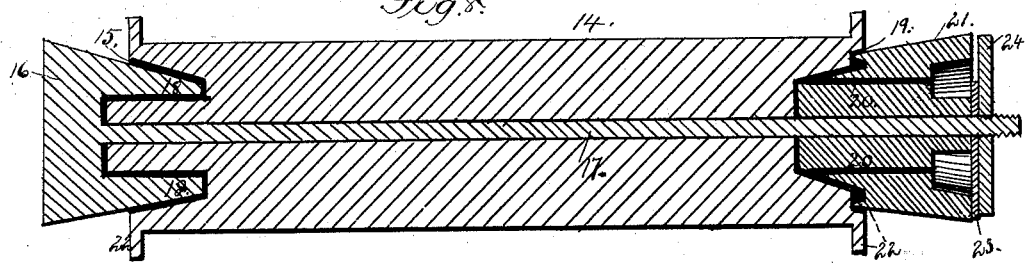
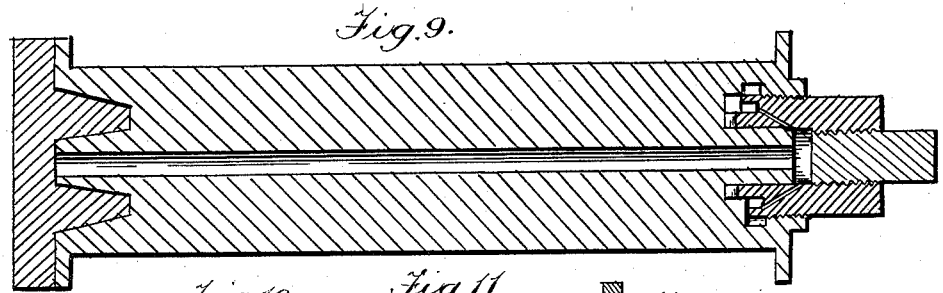
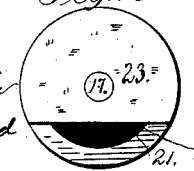
Witnesses:
T. Walter Fowler
E. H. Bradford
Inventor:
Thos. E. Jefferson
By H. T. Ennis
Atty.
N. PETERS, PHOTO-LITHOGRAPHER, WASHINGTON, D.C.

6 Sheets—Sheet 6.
T. E. JEFFERSON.
Sulky-Plow.
No. 216,415. Patented June 10, 1879.
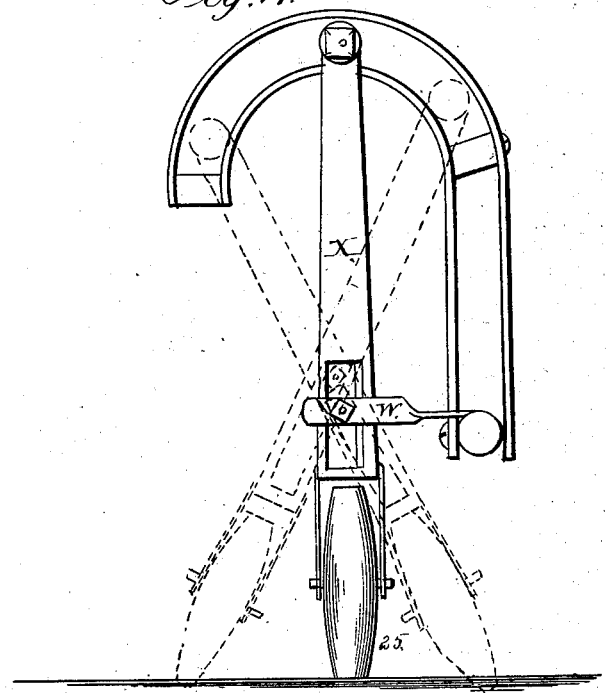
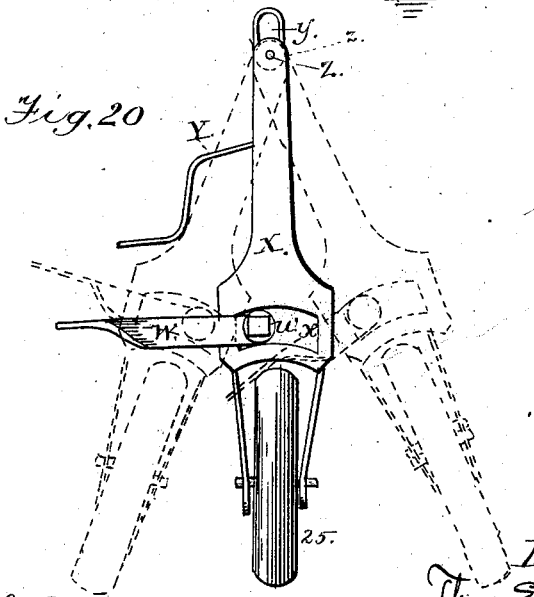
Witnesses
J. Walter Fowler
E. H. Bradford
Inventor:
Thos. E. Jefferson
By H. J. Evins
Atty.

UNITED STATES PATENT OFFICE.

THOMAS E. JEFFERSON, OF BOSTON, MASSACHUSETTS.

IMPROVEMENT IN SULKY-PLOWS.

Specification forming part of Letters Patent No. 216,415, dated June 10, 1879; application filed May 17, 1879.

*To all whom it may concern:*

Be it known that I, THOMAS E. JEFFERSON, of Boston, in the county of Suffolk and State of Massachusetts, have invented certain new and useful Improvements in Sulky-Plows; and I do hereby declare the following to be a full, clear, and exact description of the invention, such as will enable others skilled in the art to which it appertains to make and use the same, reference being had to the accompanying drawings, and to letters of reference marked thereon, which form a part of this specification, and in which—

Figure 1 is a plan view; Fig. 2, a bottom plan; Fig. 3, a side elevation, showing one of the plows; Fig. 4, a rear-end view, and Fig. 5 a detail view of chain or belt. Fig. 6 is a side elevation; Fig. 7, a horizontal section of the driving-wheels; Fig. 8, a view of the self-lubricating roll in section; Fig. 9, a modification; Figs. 10 and 11, end views of oiling-cup and cap, and Fig. 12 a modification. Fig. 13 is a detail view of eccentric on main shaft; Fig. 14, an enlarged horizontal view of the king-bolt and its connections, and Fig. 15 a cross-section of the pawl. Fig. 16 is a detail section, showing the belt-cleaners; Fig. 17, a detail plan view of one of the plows, showing the rollers and cleaners with the belts removed; Fig. 18, a detail section of the knife-guard. Figs. 19, 20 are side views of the self-adjusting furrow-wheel, the dotted lines showing its operation. Fig. 21 is a sectional view of the points R and R³, separated to show their mode of connection; Fig. 22, a plan view of the quarter-belt, and Fig. 23 a view of the wedge-bolt which secures the plow-point to the share.

My invention relates to a sulky-plow having a harrow and seeding attachment; and the novelty consists in the construction and arrangement of parts, as will be more fully hereinafter set forth, and pointed out in the claims.

Two important things to be accomplished in plowing soil are, first, to reduce the friction, and, second, to protect the plow against abrupt concussion or strain.

By my invention I not only avoid the friction due from the pressure and resistance of the soil upon the mold-board, but, by materially decreasing the lateral pressure toward the land-side and downward pressure of working plows, I am enabled to perform a maximum amount of labor with a minimum of motive power. Not only is this a mechanical fact due to the construction of my device, but an inseparable and important advantage results— viz., the manual labor of the plowman is greatly dispensed with.

I also, by an arrangement of cushions, springs, &c., protect the plow from injury from meeting firm or resisting obstructions, such as stones, stumps, or the like, the said springs not only modifying the concussion, but ever exerting a constant force to hold the plow in operating position.

The invention is designed as an improvement upon the device patented to me dated November 26, 1878, and numbered 210,201, and others, the said improvements being obvious from the following description.

The object of the invention is, first, to not only reduce the friction common to ordinary plowing, but to automatically elevate, carry, pulverize, and invert the soil.

Second, to automatically cut and sever stalks, sod, weeds, and the like by an upward circular sweep of a knife working in guides, this arrangement avoiding damage to the device by striking downward upon stones, &c., when such stones resist the blow. In this instance the knife elevates the stone out of the way, or disengages stones, &c., from clods, as is obvious.

Third, to elevate the plow-points by the draft-power of the team, such power being readily brought into action by a pedal-lever, which releases the draft-connection. A properly-braced framing, comprising an elbow-lever pivoted to the main frame, serves to elevate said plow-points at the will of the operator, as shown. This construction is deemed to be an improvement upon my Patent No. 215,929, of May 27, 1879.

Fourth, improved means to adjust the plows both vertically and laterally by a simple and efficient device, allowing the depth and width of the furrow to be governed and graduated at will by the operator.

Fifth, to provide an interchangeable flexible colter, firmly secured at each end, as shown, said colter being inclined downward from front to rear, the riding and cutting surface tending to elevate the point of the plow, or, in other words, to counterbalance the downward tendency due to the soil acting upon the reverse incline of the plow proper.

Sixth, to provide removable double plow-points, both of which are held secure by the forward one, which is secured efficiently to the share by a wedge. Said wedge, passing in proper transverse bearings, serves to draw the front point firmly against its fellow, and secure both to the share. Either point is readily replaced when broken or worn, as is obvious.

Seventh, to provide a spring from which the front of the plows is suspended, which spring acts with a constant force to counterbalance the weight of soil on the plow. It will thus be observed that when the plow-point strikes an obstruction the spring acts to elevate the said points until the obstruction is passed, when the plow readily resumes its operative position.

Eighth, in providing rubber or other spring-cushions upon the transverse rods upon which the plow-beams are hung, said cushions serving to allow a modified yielding laterally of the plows to prevent sudden concussion. These cushions are at the front and rear, and serve an important and useful function for the purposes described.

Ninth, a side wheel is provided, which is hung upon the frame, as shown, and is self-adjustable, allowing the sulky to be turned readily at the end of the furrows, the wheel accommodating itself to the occasion by swinging out or in upon its pivotal bearing. It may be hung at the center, and the upper portion swing in a semicircular carriage, where friction-rollers are in service; or it may be hung at the top and swing in or out the whole length of the frame in which the wheel is journaled. By its peculiar construction and arrangement upon the main frame forward of the main axle, it will accommodate itself to the direction of the other wheels, whether going forward, backing, or turning. The semicircular guide is so formed that as the wheel-standard leaves a vertical position to prevent the lowering of that side of the machine the friction-roll rides upon the said guides and serves to elevate that side, or, at least, to hold it level. It is obvious, then, that when the turning has been accomplished the standard will readily resume its vertical position.

Tenth, in a carrying-apron, consisting of transverse metal leaves, each end of which is looped to receive endless chains. The edges of the leaves are in close contact, and prevent the soil from entering.

Eleventh, I provide the revolving cutting disks or harrow with means for adjusting the same laterally at will independent of the mold-board.

Referring to the drawings, in which similar letters of reference indicate like parts in all the figures, A represents the main frame of the machine, furnishing journal-bearings at $a$ for a revolving axle, B, carrying a rigid wheel, B', which is the main riding-wheel of the machine. Loosely hung upon the axle B is a loose anti-friction pulley, C, held in place between transverse arms, $C^1$, rigid with the axle, and within said arms $C^1$ is journaled a friction-roller, $C^2$. This roller, being placed more or less distant from the arc described by the revolving axle B, comprises an eccentric, which is received within the aperture D of a reciprocating knife-arm, $D^1$, slotted at $d$ to receive a pin, $d^1$, and carrying a knife, $D^2$, which operates in proper cutting-guides $d^2$. The pivotal point being at the center, the revolution of the wheel B' elevates the rear end of the arm $D^1$, thrusts it forward, depresses it, and withdraws it; and this series of action serves to operate the cutting-knife $D^2$ in such a manner that the cutting stroke of said knife will be the upward motion, acting against the cutting-edges of the guides $d^2$.

Loosely hung from a cross-bar, A', on the frame A are two or more sets of curved longitudinal bars, E, which, being supported at the rear upon a vertically-adjustable frame, F, serve as the plow-frames. The frame F is composed of two approximately parallel rigid portions, which, being perforated at $f$, receives the threaded rod $F^1$, carrying the hand-nut $f^1$. Above and below the nut $f^1$ a spiral spring, $f^2$, serves to cushion the rear of the plows, and raising or lowering the nut $f^1$ serves to elevate or depress the rear end of the plows. The rod $F^1$, extending upward, receives a socket or sleeve, $F^2$, which has a socket-arm, $F^3$, supported by a spiral or other spring. The socket-arm $F^3$ receives the seat-connection, and a shade-holder, $F^4$, is above.

From cross-rods G in the plow-frames are pivoted, at $g$, arms $G^1$, which, extending forward, are provided with bifurcated extremities $G^2$, which embrace a cross-bar, H, upon an elbow-lever, H', pivoted at $h$ at the forward end of the main frame. Friction-pulleys $g'$ on the bar H are embraced by the bifurcated arms $G^2$, and rubber cushions $h^4$ upon the rod H serve to allow and modify any lateral sudden movement of the plows and frames. From the upper cross-bar of the elbow-lever H' a chain, I, connects with a double-tree or other power-connection working in a lateral slot in the tongue, and a spiral spring, J, exerts a constant force to impel the said connection to the rear.

A vertical slot in the tongue receives a hollow bolt, K, slotted at $k$ to receive a vertically-acting pawl, $K^1$, which operates in corrugations, notches, or recesses $K^2$ upon the upper face of the tongue.

Recesses $k'$ in the pawl $K^1$ receive the embracing-arms $l$ of a lever, L, which, pivoted at $l'$, serves as a pedal-lever, within easy reach of the driver. The pawl $K^1$ is held in contact with the notches $K^2$ by the constant force of a spiral spring, L'. As the force of this spring L' is overcome through the pedal-lever L, the pawl is raised, the tongue is released, the draft forces it forward, the chain operates to tilt the elbow-lever H', and the front of the plows are elevated out of the ground. The hollow bolt K is so formed as to turn with the tongue, and hence at any position of the tongue the pawl will drop into the notches of the tongue.

The tongue and the parts last described are pivoted by a proper king-bolt in a saddle, M; and a properly-braced framing, $M^1$, affords journal-bearings for an axle, $M^2$, carrying adjustable colter-wheels $M^3$, as shown, and from the said pivoted frame $M^1$ a spring draft-bar, $M^4$, as shown.

From the bifurcated ends of one of the plow-frames, or at any other proper part of the said plow-frame, is secured a reversible colter, N, of thin or flexible metal, having one or more cutting-edges, $n$, the lower end being secured to the plow in such a manner as that a proper tension will be maintained by a suitable screw-connection.

Belt-frames P, as shown, carry riding, friction, or guiding pulleys $p$ and endless belt P', or chains. The plow proper is upon the forward end of this frame. The plow has double points, one being R, fitting upon the share $R^1$, which has a longitudinal securing-flange, $R^2$; and the point R is held in place by the point $R^3$, which is secured to the share by a wedge-shaped bolt, $R^4$, which may be drawn home by a nut and thread, or otherwise; but being so employed forces the point firmly and securely to the share.

S represents rollers or pulleys journaled in the share at $s$, and the belt, apron, or chain operates in connection therewith. At proper positions, preferably near the end rollers, are inclined cleaners S', which operate to clean both the aprons and rollers from clogging soil, and to incline the dirt to the lower edge of the aprons.

T represents a shaft, journaled at $t$ in an extension, $T^1$, of the apron-frames, and a slot, $t'$, with a bolt-and-nut attachment, allows the adjustment of the disks $T^2$, hung on the shaft T, and comprising the harrow.

The plow transfers the soil to the belts when in a nearly horizontal position, and conveys it backward, turning it gradually until the same becomes disintegrated, and finally inverted. The harrow further pulverizes the soil, as shown.

V represents a seeder or planter, properly secured to the frame A, having a vibrating feed-bar and seed-tubes $v$, to correspond with the disks on the harrow. The tubes $v'$ lead to the spaces between the disks, and the disks open the furrow, and after the seed is fed upon the front side the said disks cover the seed, as shown.

W represents a framing carrying a friction-roller, $w$, operating in a curved slot, $x$, in a standard, X, pivoted to an arm, Y, having a slot, $y$, as shown. The standard X furnishes journal-bearings for a shaft, Z, carrying a wheel, $z$. As the machine is turned in either direction, the slot allows the standard and wheel $z$ to swing out or in, and, when the direction is resumed, to regain the vertical position, as shown.

A modification is shown in Fig. 19, in which the standard is pivoted at the center, and the friction-roller operates in a semicircular guide above. In the former case the standard has the sweep of its entire length, while in the latter it has but half that sweep.

The rolls over which the belts operate are of peculiar construction. The roll 14, as shown in 8, has a central longitudinal aperture, which receives the shaft-rod 17; and the lower end of said roll has a circumferential recess, 15, which receives a circumferential flange, 18, upon the lower cap, 16.

It will be observed that the circumferential space between the flange 18 and the shaft 17 forms a cup, as shown. The upper end of the roll 14 has a circular recess and a circumferential groove, 19, the former of which receives the body of the cap 21, and the latter, 19, receives the circumferential flange 22. Within the cap 21 is formed an oil-cup having ducts 20, which lead into the recess of the roll. A cap, 23, cut away at $23^\times$, allows access to the oil-cup, and a screw-cap, 24, covers the opening thus made. The caps 16 and 21 are held from binding the roll 14 by the frame, (not shown in this figure;) but the oil from the cup-reservoir gravitates through the ducts 20 to the recess in the roll, properly and efficiently lubricating all the surfaces. It gravitates through the longitudinal central orifice until it strikes the bottom of the circumferential recess in the lower cap, 16, when the centrifugal motion of the roll elevates it in the bearing, and all the friction-surfaces are efficiently oiled.

I construct the main drive-wheel B', or the other wheels, if desired, of two centrally-perforated disks, 26, which, being properly secured together in any desirable manner, firmly embrace and hold a central tire, 27, of metal. This construction gives a V-shaped periphery to the wheel, which prevents lateral play or crowding of the machine.

From the bar, H, and rigid therewith, is a vertical rod, 11, which, passing through the frame A, carries a spiral or other spring, 12, held in close contact with the frame A by a nut, 13, as shown in Fig. 3. This spring, operated by the nut, may have its elevating force adjusted so as to counterbalance the weight of soil on the plow proper, and the nut allows the spring to be thus adjusted for deep or shallow plowing. It is thus obvious that in order to elevate the plow points, the force necessary to elevate them is the simple amount necessary to lift the plows, as the weight of the soil is carried by the resistance of the spring. Not only does this advantage accrue from this construction, but the spring is an efficient cushion to force upward and relieve the points of the plows from rigid and ungiving concussion.

It will be observed that the frame A is bent near the forward end thereof toward the land-side, and this construction allows the colter-wheels M³ to ride in front the plows, as shown.

It will be observed from the foregoing description, taken in connection with the drawings, and the state of the art as it at present exists, that the device described in the foregoing specification not only performs a maximum amount of service in the art to which it belongs with a minimum amount of motive power and necessary attending labor, but that it combines several elements of service in agricultural pursuits never before aggregated together. For instance, the traveling belts not only reduce friction, as has been explained, but they receive the soil displaced to form the furrow as soon as it has been severed in a nearly horizontal position, and by the peculiar curve or twist in the said belts, due from the said belts running over a forward approximately horizontal roll and a rear vertical roll, carry it with a gradual ascent upward, rearward, and turn it into the previous furrow disintegrated, inverted, and pulverized.

The following revolving disks, being set upon a proper incline, serve as drills and coverers, and, acting in connection with a planting device having an automatically operating feed-bar, plant, feed, and cover the seed. Thus I combine in my device the elements of gang-plows, harrows, and planters, and the construction and arrangement is such that a great saving of time, labor, and consequent expense is secured. Added to this, a great advantage is secured by the peculiar operation of the plows.

By my construction a lad, a woman, or a disabled soldier, can efficiently operate the plows. The plows readily gravitate into working position, and operate efficiently, requiring no attention or manipulation, except when it is desired to elevate them out of the ground, and even in that case the lightest pressure upon the pedal-lever convenient to the operator throws the labor necessary to elevate said plows upon the draft of the horses, as has been shown and explained.

It will further be observed that the arrangement of cushions to allow and modify lateral play to the plows, and the vertical springs, both forward and rear, cushion not only the points and heels of the plows vertically, but also the draft is cushioned in such a manner as to materially modify the action of the plows. This novel arrangement of cushions and springs accommodates the plows to both lateral and vertical play, obviating damage from the plows meeting obstructing or resisting substances, but keeping them in efficient working position until thrown out of operation by the draft, as has been explained.

I attach great importance to the self-adjusting auxiliary side wheel, as described and set forth. It will be noticed that it is pivoted, whether at the center or near the top, so as to swing out or in, according to the direction the machine is turning. It rides upon anti-friction pulleys in approximately circular grooves or guides, and this bearing is so formed that the length below the pivot when at rest increases with the extent of its departure from a vertical plane. This keeps the machine level when turning, when the strain is on the side wheel; but when this strain is removed and the machine traverses the field again in a straight line, the same peculiarity of guideways for the friction-pulleys serves to bring the wheel and standard in a vertical position, where it acts efficiently as a side support.

The upward cut of the knife, as set forth, acting in concert with the cutting-guides, serves to sever stubble, stalks, and prairie grass and weeds, placing them in such condition that they may readily be plowed under; and the upward cut of the knife avoids dulling or breaking, as often occurs when the stroke is downward.

What I claim is—

1. The axle B, anti-friction pulley C, arms $C^1$, and friction-roller $C^2$, combined with the knife-arm $D^1$, pivoted at $d^1$, to give upward stroke to the knife, as and for the purpose set forth.

2. The knife-arm $D^1$ D, having knife $D^2$, as shown, combined with the eccentrics C $C^1$ $C^2$ and cutting-guides $d^2$, as set forth.

3. The curved bars E, carrying the plows, combined with the adjustable frame F, as set forth.

4. The adjustable frame F, combined with the operating thumb-nut $f^1$, and with springs $f^2$ above and below, as specified.

5. The adjustable harrow composed of the shaft T and disks $T^2$, combined with the slot $t'$ in the frame $T^1$ and proper securing devices, whereby the said harrow may be adjusted independent of the mold-board, as specified.

6. A double-slotted sliding tongue, combined with a double-tree and an intervening spring, J, as and for the purpose specified.

7. The sliding slotted tongue and double-tree and spring J, combined with an elbow-lever, H, and chain I, for raising the points of the plows out of the ground by the draft, as specified.

8. The tongue, draft-chain I, and elbow-lever H', combined with a self-adjusting king-bolt, K, pawl $K^1$, and notches $K^2$, as set forth.

9. The self-adjusting king-bolt K, pawl $K^1$, and notched tongue $K^2$, combined with pedal L $l$, elbow-lever H', and chain I, connecting with draft, as set forth.

10. In a sulky-plow, the combination of the slotted hollow king-bolt K, pawl $K^1$, pedal-lever L, and draft, as specified.

11. The spring draft-bar $M^4$, combined with the king-bolt K, frame M $M^1$, and draft, as and for the purposes set forth.

12. The elbow-lever H' H, having pulleys $g'$, and the draft and connecting chain, with the plow-frames G, with jaws $G^1$, as and for the purpose set forth.

13. The elbow-lever H' H and plow-frames G $G^1$ $g'$, combined with the rod 11, nut 13, and spring 12, which overbalances the soil, as and for the purposes set forth.

14. The spring 12, rod 11, and adjusting-nut 13, to counterbalance the soil upon the plows, combined with the plow-frames and the main frame A, as set forth.

15. The cushions $h^4$ on bar H of the elbow-lever H', to allow and modify a yielding lateral motion to the front end of plows, as specified.

16. The spring 12 and connections 11 and 13 on the elbow H' and frame, in combination with the cushions $h^4$ on the bar H, to regulate and modify the perpendicular and lateral motion of the front of the plows, as specified.

17. The combination of the draft-spring J, spring 12, and cushions $h^4$, with their connections, to prevent concussion from the front of the plows coming in contact with resisting substances, as set forth.

18. A furrow side wheel attached to or journaled in an oscillating standard, and adapted to automatically adjust itself with its connections, as and for the purpose set forth.

19. The standard X, carrying furrow-wheel 25, pivoted loosely at Z $z$, and adapted to swing in a modified degree in a curved slot, $x$, as set forth.

20. The combination of the standard X, furrow-wheel 25, curved slot $x$, and pulleys $w$ $z$ with the arm W of the frame and arm Y, as specified.

21. The pivoted frames E and pivoted levers $G^1$, comprising the plow-supporting frame, as set forth.

22. The springs $f^2 f^2$ and frame E, combined with the rear portion of the plow-frame E $G^1$, to cushion the plows vertically in either direction, as specified.

23. The frame E, pivoted to the cross-bar $A^1$ of the frame A, and the frame $G^1$, pivoted at G to the frame E, adapted to support the plows, and having a double pivoted joint, as shown.

24. The vertical bar $F^1$, nut $f^1$, and frame F, combined with the springs $f^2$ above and below the nut $f^1$, and with the plow-frame E, as set forth.

25. The bifurcated frames $G^1$ 28, pivoted to the horizontal shaft G, combined with the plows, and with the bar H, to afford a firm support to the plows, as specified.

26. The combination of the springs $f^2 f^2$ and the cushions $h^4$ with the plow-frame and frame A, to cushion the plow-frames both laterally and vertically, as shown and described.

27. In combination with the plow having a belt or endless-chain mold-board, the seeder and planter V, having automatic feed-bar $v$, combined with the harrow T $T^2$ and connecting-tubes $v'$, as set forth.

28. The point R, held upon the share $R^1$ by the point $R^3$ and the securing-wedge $R^2$ $R^4$, as and for the purpose set forth.

29. A reversible adjustable flexible colter, N, inclined as shown, combined with the frame $G^1$ $G^2$ and plow, as set forth.

30. A plow mold-board consisting of one or more traveling belts or endless aprons, running over a forward approximately horizontal roll and a rear vertical roll adapted to receive the soil from the share near the point and elevate, carry, disintegrate, and invert the same, as specified.

31. The harrows T $T^2$, inclined as shown, combined with one or more carrying-belts, as shown, for the purpose specified.

32. One or more cleaners S', as shown, combined with the belt P' and rollers S, and adapted to automatically clean both at the same time, as specified.

33. One or more cleaners situate in rear of belts, and adapted to clean the harrows T and outside of belt at same time, as set forth.

34. The chain formed of the metal plates P', having sharpened edges and end loops, and endless chains passing through said loops, as and for the purposes set forth.

35. The roller 14, having slots 15, 19, and 20 combined with flanged cap 16 18 and cup-cap 21, as set forth.

36. The cup-cap 21, combined with cap or cover 23, cut away at $23^\times$, and with the covering securing-cap 24, adapted to serve, with the roller 14, as set forth.

37. In a plow, the combination of the self-lubricating roll 14 described with one or more traveling belts, as specified.

In testimony that I claim the foregoing I have hereunto set my hand this 17th day of May, 1879.

THOMAS E. JEFFERSON.

Witnesses:
W. T. HUTCHINSON,
H. J. ENNIS.